United States Patent Office 2,911,424
Patented Nov. 3, 1959

2,911,424

TITANIUM AND ZIRCONIUM ORGANIC COMPOUNDS AND PROCESS OF PREPARATION

Daniel Kaufman, Edison Township, N.J., assignor to National Lead Company, New York, N.Y., a corporation of New Jersey No Drawing. Application June 1, 1956
Serial No. 588,600

6 Claims. (Cl. 260—429.3)

This invention relates in general to titanium and zirconium organic compositions and more specifically to titanium-carbon and or zirconium-carbon bonded compositions.

A number of metal-carbon bonded compositions have previously been prepared and among these are bis-cyclopentadienyl titanium or zirconium, and bis-cyclopentadienyl titanium or zirconium dihalide. The latter compositions and their method of preparation is more fully described and claimed in my co-pending application Serial No. 443,956, filed July 16, 1954, which is assigned to the same assignee as the instant application.

Such compositions are of interest as catalytic agents and as intermediates in various organic reactions for the preparation of other organic compounds. It is desirable, therefore, to produce derivatives of such compositions so that these compositions may have wider applications in various organic systems.

One type of derivative of bis-cyclopentadienyl titanium or zirconium dihalide is prepared by reacting bis-cyclopentadienyl titanium or zirconium dihalide with chlorine, bromine or iodine to produce either cyclopentadienyl (dihalocyclopentenyl) titanium or zirconium dihalide or cyclopentadienyl (tetrahalocyclopentanyl) titanium or zirconium dihalide. These two derivatives of titanium or zirconium and their methods of preparation are more fully described and claimed in my co-pending application Serial No. 540,167, filed October 12, 1955, now abandoned. These derivatives are employed as the starting material for preparing another type of derivative in the instant invention.

An object of the instant invention therefore is to produce derivatives of bis-cyclopentadienyl titanium or zirconium compounds. A further object is to prepare derivatives of bis-cyclopentadienyl titanium or zirconium dihalides. Another object is to produce new derivatives from either cyclopentadienyl (dihalocyclopentenyl) titanium or zirconium dihalide or from cyclopentadienyl (tetrahalocyclopentanyl) titanium or zirconium dihalide. A further object is to provide a method for producing derivatives of bis-cyclopentadienyl titanium or zirconium dihalide. These and other objects will become more apparent from the following more complete description of the instant invention.

Broadly this invention contemplates a composition comprising one cyclopentadienylene group and two halogens attached to each titanium or zirconium. The composition of the instant invention is prepared by oxidizing a derivative of bis-cyclopentadienyl titanium or zirconium dihalide, said derivative comprising one aliphatic 5 membered carbon ring having from 2 to 4 halogens attached thereto, and one cyclopentadienyl group bonded to said aliphatic carbon ring by a metal atom having two halogens attached thereto, and selected from the group consisting of cyclopentadienyl (dihalocyclopentenyl) titanium or zirconium dihalide and cyclopentadienyl (tetrahalocyclopentanyl) titanium or zirconium dihalide.

The starting materials, for the preparation of the new and novel composition of this invention, are either cyclopentadienyl (dihalocyclopentenyl) titanium or zirconium dihalide or cyclopentadienyl (tetrahalocyclopentanyl) titanium or zirconium dihalide which compositions, as stated above, are derivatives of bis-cyclopentadienyl titanium or zirconium dihalide prepared according to the description of my co-pending patent application Serial No. 540,167.

In carrying out the process of the instant invention, the derivatives of bis-cyclopentadienyl titanium or zirconium dihalide mentioned above are oxidized by various methods such as for example, exposure to the atmosphere over an extended period of time, or more conveniently, by recrystallization from ethers, for example, those which have a high peroxide content. In fact, any standard organic oxidizing procedure using any standard oxidizing agent for organic reaction may be used for carrying out the process of the instant invention. The process is simple and straightforward.

The oxidation of either the cyclopentadienyl (dihalocyclopentenyl) titanium or zirconium dihalide or the cyclopentadienyl (tetrahalocyclopentanyl) titanium or zirconium dihalide takes place rapidly and the oxidized product produced forms a solid in the bottom of the vessel. This solid is then removed from the oily liquid formed by the reaction by any simple well known means.

In preparing the starting materials employed in the instant invention, using the process described and claimed in my co-pending application Serial No. 540,167, bis-cyclopentadienyl titanium or zirconium dihalide is halogenated by merely reacting the bis-cyclopentadienyl titanium or zirconium dihalide with a halogen and either of the starting materials employed in the instant invention are formed. The cyclopentadienyl (dihalocyclopentenyl) titanium or zirconium dihalide forms first and upon further halogenation the cyclopentadienyl (tetrahalocyclopentanyl) titanium or zirconium dihalide is formed. If this halogenation reaction of bis-cyclopentadienyl titanium or zirconium dihalide is carried out in the presence of an axidizing agent, the starting materials are formed in situ and are converted to the composition of the instant invention, i.e., a composition having one cyclopentadienylene group and two halogens attached to each titanium or zirconium atom without actually isolating the starting materials. These derivatives of bis-cyclopentadienyl titanium or zirconium dihalide are formed upon halogenation and they can be isolated and used as the starting material for the present invention or they can be used as the starting material in the form of a suspended solid in a mixture where they can be oxidized without actually isolating the materials before carrying out the oxidizing reaction of the instant invention.

In order to more fully describe the instant invention, the following examples are presented:

Example 1

Cyclopentadienyl (dichlorocyclopentenyl) titanium dichloride was prepared by reacting bis-cylopentadienyl titanium dichloride dissolved in carbon tetrachloride with chlorine gas. The reaction was carried out under an inert atmosphere. An orange colored residue was removed from solution and was identified as cyclopentadienyl (dichlorocyclopentenyl) titanium dichloride.

This orange colored cyclopentadienyl (dichlorocyclopentenyl) titanium dichloride was used as the starting material for preparing the compositions of the instant invention.

One gram of the orange colored cyclopentadienyl (dichlorocyclopentenyl) titanium dichloride was dissolved in 50 ml. of diethyl ether. The ether contained sufficient peroxide to oxidize the alkyl carbon-titanium bond. A yellow colored ether insoluble product was readily formed in the vessel. 0.25 gram of the yellow product was recovered by filtration and washing. The product recovered contained one 5 membered carbon ring and 2 chlorines attached to each titanium and was identified as monocyclopentadienylene titanium dichloride.

Example 2

Cyclopentadienyl (tetrachlorocyclopentanyl) titanium dichloride was used as the starting material in this run and was prepared in a similar manner as the cyclopentadienyl (dichlorocyclopentenyl) titanium dichloride described in Example 1 except that the chlorinated mixture was placed in the refrigerator at 0° C. overnight. An orange colored product was recovered the next morning.

One gram of the orange colored cyclopentadienyl (tetrachlorocyclopentanyl) titanium dichloride was dissolved in 50 ml. of carbon tetrachloride. Oxygen gas was bubbled through the solution at the rate of 50 ml. per minute for two hours. The treated solution was set aside overnight. After standing, it was observed that the solvent had evaporated off leaving two phases, one the air oxidized canary yellow solid product and the other an oil (faintly orange colored liquid). The liquid was removed by dissolving in ether and the analysis showed it to be the chlorinated cyclopentane fragment that had been split off from the starting product. The yellow solid proved to be identical to the product obtained in Example 1 above.

Example 3

In this run cyclopentadienyl (tetrabromocyclopentanyl) titanium dichloride was used as the starting material and was prepared by reacting bis-cyclopentadienyl titanium dichloride dissolved in carbon tetrachloride with an equivalent amount of liquid bromine to form the tetrabromo compound. The treated mixture was placed overnight in a refrigerator at 0° C. Orange colored crystals of cyclopentadienyl (tetrabromocyclopentanyl) titanium dichloride were obtained.

One gram of the orange colored cyclopentadienyl (tetrabromocyclopentanyl) titanium dichloride were dissolved in 200 ml. of diethyl ether and chlorine gas at the rate of 50 ml. per minute was bubbled through the solution. The solution was also exposed to the atmosphere which provided sufficient oxygen for oxidation to take place. After 20 minutes the introduction of chlorine gas was terminated and the yellow residue which formed in the vessel was removed by filtration. 0.3 gram of the monocyclopentadienylene titanium dichloride was obtained. The product had one cyclopentadienyl and two halogens attached to each titanium. Its melting point was 167–169° C. and was the same product as that described in Examples 1 and 2.

Example 4

In this run cyclopentadienyl (tetrabromocylopentanyl) titanium dichloride was used as the starting material and it was prepared in the same manner as that used in Example 3, except that 2 ml. of liquid bromine dissolved in carbon tetrachloride were used in place of the chlorine gas.

One gram of the cyclopentadienyl (tetrabromocyclopentanyl) titanium dichloride dissolved in diethyl ether was reacted with 0.5 gram of benzoyl peroxide dissolved in 50 ml. carbon tetrachloride. After a few minutes a yellow precipitate appeared which was recovered from the solution by filtration. This product was substantially identical to the product obtained in the previous examples.

Example 5

Cyclopentadienyl (tetraiodocyclopentanyl) titanium dibromide was prepared by reacting bis-cyclopentadienyl titanium dibromide with iodine dissolved in carbon tetrachloride. The mixture was refluxed for 1 hour then cooled and allowed to stand overnight. One gram of the cyclopentadienyl (tetraiodocyclopentanyl) titanium dibromide dissolved in 200 ml. of carbon tetrachloride was oxidized with 10 ml. of peroxide ether and the same product, i.e. monocyclopentadienylene titanium dibromide, was obtained.

Example 6

In this run cyclopentadienyl (tetrabromocyclopentanyl) titanium difluoride was used as the starting material and it was prepared by reacting bis-cyclopentadienyl titanium difluoride with liquid bromine and was allowed to stand overnight in a refrigerator at 0° C.

One gram of the cyclopentadienyl (tetrabromocyclopentanyl) titanium difluoride dissolved in 200 ml. of carbon tetrachloride, was oxidized by bubbling air through the solution at the rate of 50 ml./min. for 1 hour and monocyclopentadienylene titanium difluoride was obtained.

Example 7

Cyclopentadienyl (dichlorocyclopentenyl) zirconium dichloride was used as the starting material and it was prepared in the same manner as the cyclopentadienyl (dichlorocyclopentenyl) titanium dichloride except that bis-cyclopentadienyl zirconium dichloride was used in place of bis-cyclopentadienyl titanium dichloride.

The cyclopentadienyl (dichlorocyclopentenyl) zirconium dichloride was oxidized in the same manner as that described in Example 1 and it was identified as monocyclopentadienylene zirconium dichloride.

Example 8

Cyclopentadienyl (tetrabromocyclopentanyl) zirconium difluoride was prepared by reacting bis-cyclopentadienyl titanium difluoride with liquid bromine and allowing the mixture to stand overnight in the refrigerator. This product was used as the starting material.

One gram of the cyclopentadienyl (tetrabromocyclopentanyl) zirconium difluoride dissolved in 200 ml. of carbon tetrachloride was oxidized with air in the same manner as that described in Example 6. The product obtained was monocyclopentadienylene zirconium difluoride.

From the above description and by the examples shown, new and novel derivatives of bis-cyclopentadienyl titanium or zirconium dihalide have been obtained. These derivatives contain one cyclopentadienylene group and two halogens attached to each titanium or zirconium. They are resistant to air oxidation, and non-reactive with water and thermally stabilized when heated in an oxygen atmosphere. They are also characterized by their bright yellow color. Such compounds are useful as polymerization agents, catalysts, coloring agents for pigments, and for other organic reactions, including oxidation in internal combustion engines and as heat transfer agents and the like. These compositions are simple to prepare and in general can be stabilized for wider application in various organic systems than the compositions from which they are prepared.

While this invention has been described and illustrated by the examples shown, it is not intended to be strictly limited thereto, and other modifications and variations may be employed within the scope of the following claims.

I claim:

1. A metal organic compound consisting essentially of one cyclopentadienylene group and two halogens directly attached to a metal atom selected from the group consisting of titanium and zirconium, said metal being present in the tetravalent state and said halogen selected from the group consisting of fluorine, chlorine, bromine or iodine.

2. Compound according to claim 1 in which the metal is titanium.

3. Compound according to claim 1 in which the metal is zirconium.

4. A method for the preparation of a metal organic compound which comprises oxidizing a compound selected from the group consisting of cyclopentadienyl (dihalocyclopentenyl) metal dihalide and cyclopentadienyl (tetrahalocyclopentanyl) metal dihalide, said metal being selected from the group consisting of titanium and zirconium, the halo portion of said compounds being selected from the group consisting of fluoro, chloro, bromo and iodo and said halide being selected from the group consisting of fluoride, chloride, bromide and iodide.

5. Method according to claim 4 in which said compound employed is cyclopentadienyl (dichlorocyclopentenyl) titanium dichloride.

6. Method according to claim 4 in which said compound employed is cyclopentadienyl (tetrachlorocyclopentanyl) titanium dichloride.

References Cited in the file of this patent

FOREIGN PATENTS

| | | |
|---|---|---|
| 1,080,357 | France | May 26, 1954 |
| 1,108,869 | France | Sept. 14, 1955 |

OTHER REFERENCES

Wilkinson et al.: "J.A.C.S." 75, 1010–12, February 20, 1953.

Stewart: "An Encyclopedia of The Chemical Process Industries," Chemical Publishing Co., Inc. New York, 1956, pp. 542 and 543.